United States Patent [19]
Minks

[11] 3,890,948
[45] June 24, 1975

[54] ALTERNATOR DRIVEN CAPACITOR POWER SYSTEM

[75] Inventor: Floyd M. Minks, Kissimmee, Fla.

[73] Assignee: Brunswick Corporation, Chicago, Ill.

[22] Filed: June 13, 1968

[21] Appl. No.: 736,789

[52] U.S. Cl....... 123/148 E; 123/149 R; 123/149 D
[51] Int. Cl.............................................. F02p 3/06
[58] Field of Search... 123/148 AC, 148 E, 148 DC, 123/149 D; 315/209, 209 CD, 218, 223; 310/68, 93

[56] References Cited
UNITED STATES PATENTS

| | | | |
|---|---|---|---|
| 3,186,397 | 6/1965 | Loudon | 123/148 E |
| 3,240,198 | 3/1966 | Loudon et al. | 123/148 E |
| 3,324,841 | 6/1967 | Kebbon et al. | 123/149 |
| 3,358,665 | 12/1967 | Carmichael et al. | 123/148 E |
| 3,447,521 | 6/1969 | Piteo | 123/148 |
| 3,461,851 | 8/1969 | Stephens | 123/149 |
| 3,464,397 | 9/1969 | Burson | 123/148 |

*Primary Examiner*—Charles J. Myhre
*Assistant Examiner*—Cort Flint
*Attorney, Agent, or Firm*—Andrus, Sceales, Starke & Sawali

[57] ABSTRACT

A capacitor discharge ignition system includes an alternator having a pair of windings to charge a capacitor which is connected in a series output circuit with a pulse transformer and a silicon controlled rectifier. The two windings are connected to establish in-phase voltages at low speed and out-of-phase voltages at high speed and to apply the sum of the voltages of the two windings to the capacitor during the positive half cycle of the voltages, with the one winding also connected directly across the capacitor through suitable blocking diodes such that it can charge the capacitor independently of the second winding. Both the windings are also connected to charge a firing capacitor which is connected across the gate to cathode of the rectifier in series with a voltage sensitive switching device. During the negative half-cycle, either or both windings will provide power to charge the firing capacitor in accordance with the relative amplitude and phase of their voltages until the voltage of the voltage sensitive switching device is reached, at which time the capacitor discharges and triggers the silicon controlled rectifier.

13 Claims, 3 Drawing Figures

PATENTED JUN 24 1975　　　　　　　　　　　　　3,890,948

INVENTOR
FLOYD M. MINKS
BY
Andrus, Scales, Starke & Sawall
Attorneys

ALTERNATOR DRIVEN CAPACITOR POWER SYSTEM

This invention relates to an alternator driven capacitor power system and particularly to such a capacitor discharge ignition system employing an alternator having a pair of windings connected to charge a main capacitor.

Capacitor discharge ignition systems have been suggested for internal combustion engines including outboard motors and the like. A highly satisfactory capacitor discharge ignition system is disclosed in applicant's copending application entitled Alternator Driven Capacitor Discharge Ignition System filed on Nov. 3, 1966 with Ser. No. 591,790. As more fully disclosed therein, one of the principal problems in connection with alternator driven capacitor discharge ignition systems has been the provision of a suitable pulse forming means for firing of an electronic switch such as a silicon controlled rectifier. That application discloses a simple and reliable means wherein the positive half-cycle of the alternator output is employed to charge a capacitor and the negative half-cycle of the output of the alternator establishes a pulse to fire an electronic switch and discharge the capacitor.

Under certain conditions it is desirable to provide a pair of windings, one of which contains a greater number of turns than the other. The amplitude and phase of the voltages produced by two such windings vary with RPM in such a way that they can be connected to give relatively little variation, with RPM, in the voltage to which they will charge a capacitor. It has been suggested that one of the windings can be employed to trigger the switch. In such systems the firing of the switch to discharge the capacitor has been found to provide somewhat eratic or unreliable action.

Applicant realized that in connection with a dual winding system the firing provided by one of the windings is eratic because of the timing requirements of an internal-combustion engine. Applicant further realized that the alternator with the dual windings introduces inductive characteristics into the circuit which result in certain problems particularly in proper timing for smooth desired operation of an internal-combustion engine. The one winding generally includes a relatively small number of turns while the second winding includes a substantial number of turns. This results in too low a voltage at low speed in the winding with fewer turns and an undesirably high phase shift inductance resulting from the high turn winding at high speed.

The firing pulse generated by the power supplied from a high turns winding of the alternator results in a substantial retarding of the firing as the frequency increases, whereas just the opposite result is desired. The low turns winding has insufficient output for proper timing at low speed. The present invention is particularly directed to a very convenient and reliable system for proper firing in such an alternator driven capacitor discharge ignition system over the entire engine speed range including low cranking speeds.

Generally, in accordance with the present invention, both the first and second windings differing in the number of turns are connected to the firing circuit and whichever winding provides greatest effectiveness at the existing RPM establishes the firing signal. Applicant has found that this results in essentially constant firing time and, in fact, includes a highly desirable slight retarding as speed increases at low speeds. When the engine is placed in low speed and the gears shifted to neutral, the tendency of the engine to accelerate is thereby minimized.

Generally, in accordance with the present invention, the windings are connected to charge the capacitor; for example, as generally disclosed in applicant's copending application. Additionally, both windings are connected to a trigger circuit for an electronic switch such as a silicon controlled rectifier. The trigger circuit may include a firing capacitor and a voltage sensitive device. During the negative half-cycle, both windings are connected to provide power to charge the firing capacitor until the voltage of the voltage sensitive device is established, at which time the capacitor discharges and triggers the electronic switch.

In one construction, the windings are connected to apply the sum of the voltages of the two windings to the capacitor, with the first winding having the smallest number of turns also connected directly across the capacitor through suitable blocking diodes such that the first winding can charge the capacitor independently of the second winding. In another construction, both windings are connected from a circuit tie point through respective diodes to the capacitor, the other capacitor lead being returned to said tie point. When the windings are both interconnected to the firing circuit in accordance with this invention, the timing characteristics provide accurate and reliable timing firing of the engine from even slow cranking speeds to maximum speed. This has been found to provide a very reliable alternator driven capacitor discharge ignition system which has been found to be particularly suitable to commercial usage.

The drawing furnished herewith illustrates a preferred construction of the present invention in which the above advantages and features are clearly disclosed as well as others which will be clear from the following description of the drawing.

Figure 1:
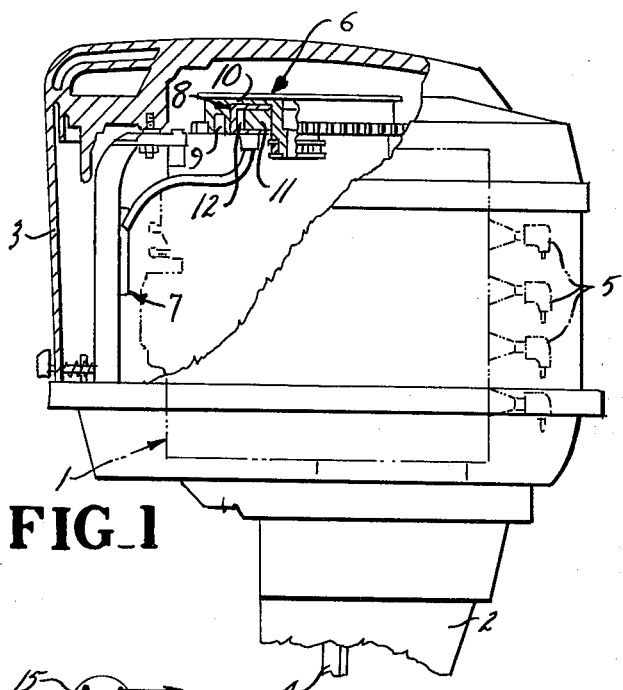
FIG. 1 is a diagrammatic view of an outboard motor employing an alternator driven capacitor discharge ignition system.

Referring to the drawing and particularly to FIG. 1, a portion of an outboard motor is shown having an internal-combustion engine 1 mounted on a lower drive shaft unit 2 and enclosed within a suitable protective and decorative housing 3 as shown in applicant's previously identified copending application. The engine is of any suitable construction; for example, the usual two cycle internal-combustion engine widely employed in highly satisfactory outboard motor units and connected in any suitable means through a drive mechanism including a shaft 4 to a propeller, not shown, at the lower end of the unit. The present invention is particularly concerned with the ignition system for the engine 1 and consequently no further detailed description of the engine is given other than necessary to clearly describe the operation of the ignition system and its connection to the spark plugs 5 of the engine.

Generally, in the illustrated embodiment of the invention, an alternator 6 is mounted either as a part of the flywheel assembly of the engine or as part of a distributor assembly, not shown, and connected to a capacitor discharge ignition unit 7 for firing of the spark plugs 5 of the engine. The alternator 6 can be any suitable type; for example, as shown and more fully described in U.S. Pat. No. 2,856,550. The alternator 6 may be mechanically rotated for timing advance. Generally, a permanent magnet rotor 8 is connected to the flywheel assembly. The rotor 8 includes a plurality of circumferentially distributed pole pieces and magnets 9 held within an annular support 10 having the central portion secured to the flywheel assembly for distributor shaft. The number of pole pieces is effectually twice the number of sparks desired per revolution. A stator 11 is mounted to the block of engine 1 adjacent the rotor 8 and in accordance with the structure of the present invention includes a dual winding unit 12 wound on suitable pole pieces. The alternator 6 may of course be a separate unit coupled to the flywheel assembly in any suitable manner; for example, as shown in U.S. Pat. No. 2,890,689.

Figure 2:
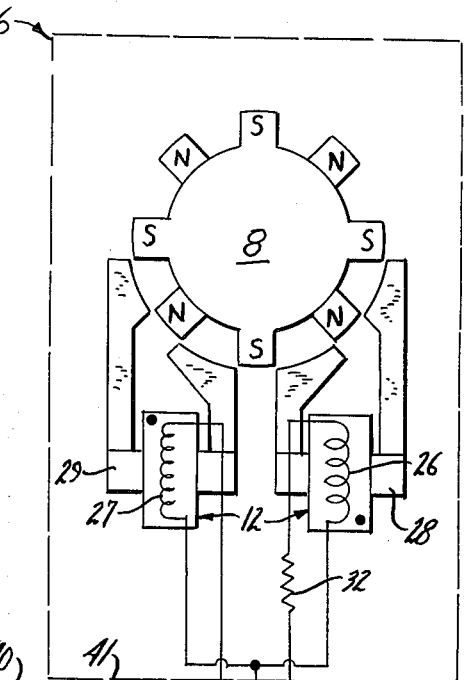
FIG. 2 is a schematic circuit of a dual winding alternator capacitor discharge ignition system constructed in accordance with the present invention.

Referring particularly to FIG. 2, the output of the alternator 6 and particularly winding unit 12 is connected to charge a capacitor 13 forming a part of the unit 4. The capacitor 13 is connected to be periodically discharged through a pulse transformer 14 and a distributor 15 to the spark plugs 5. In the illustrated embodiment of the invention, the charging and discharging circuits for the capacitor 13 are similar to the circuit of applicant's copending application entitled Capacitor Ignition System filed on Mar. 1, 1965 with Ser. No. 436,118.

The one side of the alternator winding unit 12 is connected through a diode circuit 16a, hereinafter described, to a common or ground line 16 which is connected to the one side of the capacitor 13 by a stabistor 17, shown as a dual pellet diode which may be desirable for higher speed capability such as found in present six cylinder outboard motors, and by a primary winding 18 of the transformer 14 in parallel. The charging circuit is completed by the connection of the opposite side of the alternator winding unit 12 to the opposite side of the capacitor 13 via the line 19. During the period that the winding unit 12 has the proper polarity, current flows from the alternator winding unit 12 through the diode connecting circuit, the stabistor 17 and the primary winding 18 to the capacitor 13 and returns to the opposite side of the alternator winding unit 12 via the line 19; thereby charging the capacitor 13.

The capacitor 13 is connected to be discharged through the primary winding 18 of the transformer 14 by a silicon controlled rectifier 20 which has its anode 21 connected to the ground line 16 and its cathode 22 connected to the negative side of the capacitor 13. A protective diode 23, shown as a Zener diode, is connected in parallel with the silicon controlled rectifier 20 to protect the rectifier from damaging reverse polarity voltages, as may for example be produced by open circuit operation. The silicon controlled rectifier 20 includes the usual gate 24 connected to a trigger circuit 25 constructed and connected to the winding unit 12 in accordance with the present invention.

More particularly, in the illustrated embodiment of the invention, as shown in FIG. 2, the alternator 6 is a dual winding unit having a first winding 26 and a second winding 27 mounted adjacent the permanent magnet rotor 8 which is connected to the flywheel assembly. The relative instantaneous polarity of the two windings 26 and 27 is diagrammatically shown in the conventional manner by the provision of a dot at the positive ends of the windings.

The windings 26 and 27 are shown wound on similar U-shaped core structures 28 and 29 disposed to or immediately in side-by-side relation adjacent the rotor 8. The movement of rotor 8 past the core structures 28 and 29 induces a related alternating voltages in the windings 26 and 27. As diagrammatically shown, the first winding 26 has a relatively small number of turns when compared to the second winding 27. When working into a fixed capacitive load, the voltage to which the capacitor will be charged by the second winding 27 will be greatest at the low speed because of the substantial number of turns. However, as the frequency increases, it reaches and exceeds the resonant frequency between the leakage inductance and the high turn winding and the essentially capacitive load, causing relatively reduced output energy from the winding 27 to charge the capacitor and a corresponding increase in the output energy of the winding 26 to charge the capacitor.

The windings 26 and 27 are connected to charge the capacitor 13 in the following circuit.

The first winding 26 has the one end connected to the ground side of the charging circuit in series with a blocking diode 30 through the illustrated ground connection 31. The opposite end of the winding 26 is connected directly to the lead 19. A resistor 32 is shown connected in the connection to lead 19. Resistor 32 limits the output of winding 26 applied to the charging circuit during high speed motor operation to minimize the dissipation of power in the protective Zener diode 23 at such high speed. The desired resistance which may be inherent in the winding 26 is shown added for purposes of description.

The second winding 27 has the illustrated positive end connected in series with a diode 33 to the ground connection 31. The opposite side of winding 27 is connected to the illustrated positive side of the high speed winding 26.

The first winding 26 is therefore connected directly across the capacitor in series with the diode 30. The second winding 27 is connected in series with its own diode 33 directly across the diode 30.

In operation, the voltages of the windings 26 and 27 add to charge the capacitor 13. Additionally, the first winding 26 can separately charge the capacitor independently of the second winding 27.

In the illustrated embodiment of the invention, protective capacitors 34, 35 and 36 are connected one each between the output leads from the alternator unit 12 to ground. The capacitors 34–36 protect against possible high voltage transients which may result from the spark discharge under certain engine mounting configurations.

In operation, the alternator unit 12 provides a charging current to the capacitor 13 during the positive portion of the output of the windings 26 and 27. The duration of the positive portion of the wave form may exceed one-half cycle because of the effects of phase shift. During the initial starting and at very low speeds, the output of the second winding 27 provides a predominant portion of the power to charge the capacitor 13 to the desired level during the positive portion of each cycle. As the speed increases, the proportion of the power supplied by the windings changes inversely until during high speed operation, the characteristics of the winding 26 and 27 as a result of the differing number of turns are such that the winding 26 furnishes the predominant portion of the power to charge the capacitor 13. During the negative portion of the output of windings 26 and 27, trigger circuit 25 is connected to be energized from both windings 26 and 27 to properly fire the control rectifier 20. The phase shift characteristic of the windings may be such that the trigger circuit 25 is energized from a single one of the windings. For example, at some high speed operation, the phase shift will be such that the winding 27 with the greater number of turns does not enter the negative portion of the cycle until well after the winding 26 with the lower number of turns. The trigger circuit 25 may then be energized only by the winding 26 to properly fire the control rectifier 20.

Figure 3:
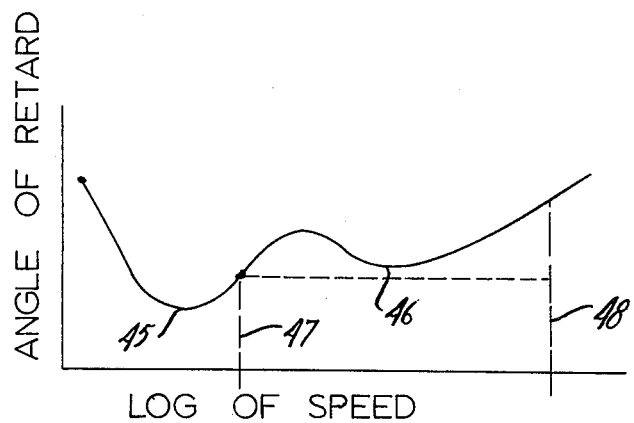
FIG. 3 is a simplified illustration of the timing characteristics provided by the dual firing system of the present invention.

The illustrated trigger circuit 25 for firing of the rectifier includes a capacitor 37 having one side connected to the gate 24 of the rectifier and the opposite side connected in series with an impedance unit 37a such as the resistor 38 of a relatively high resistance to the common junction between the first winding 26 and the second winding 27. Additionally, the capacitor 37 is connected in series with an impedance unit 39a shown as the resistor 40 and a diode 41 to the opposite end of the second winding 27. The impedances may or not be a unilateral construction. The impedances of units 37a and 39a can be adjusted to shape the particular timing characteristic, such as shown in FIG. 3. The cathode connection of the rectifier 24 constitutes a return path from the opposite end of the winding 26.

A voltage sensitive switching device 42 is connected between the capacitor 37 and the return line or cathode. A protective diode 43 is paralleled with the voltage sensitive switching device 42. A gate to cathode shunt resistor 44 is connected directly across the gate to cathode circuit and thus in series with the capacitor 37 to the windings 26 and 27 for charging of capacitor 37.

The voltage sensitive device 42 may be any suitable device which will provide reliable switching action in response to a selected voltage on the capacitor 37. For example, device 42 may be the well known Shockley diode or, General Electric Co. of the United States has developed a unilateral solid state switch identified as a "Sus" switch unit which has been found to provide a highly reliable triggering device.

During the relatively positive portion of the cycle when power is being supplied to the capacitor 13, the output is blocked from the firing capacitor 37. The diode 41 blocks the output of the winding 27. The diode 41 further prevents loading of the winding 27 at low speeds. The resistor 40 having a relative high resistance is selected to minimize the loading of the alternator. The resistor 38 prevents loading of coil 26 during the corresponding charging cycle and the small amount of current that does flow into trigger circuit 25 is bypassed by the diode 43. A diode, not shown, may be connected in series with resistor 38 although the resistance of resistor 38 is normally sufficiently great to avoid the necessity for a diode. The impedances 37a and 39a, which are not necessarily linear and/or bilateral, connected between the trigger circuit and the alternator windings 26 and 27 may vary the advance characteristic of the ignition system, as shown in FIG. 3, and permit design related to a particular engine design.

During the negative half cycle the diodes 30 and 33 block the output of the windings 26 and 27 from the charging circuit of the main capacitor 13. However, at this time both windings 26 and 27 are connected to provide power to the trigger capacitor 37. The relative assumed polarity of the winding 26 is reversed from that shown in FIG. 2 and therefore charges through the resistor 44, capacitor 37, the resistors 38 and 32. The polarity of the winding 27 also reverses and correspondingly provides current through the winding 26, resistor 44, the trigger capacitor 37, resistor 40 and diode 41. In operation, therefore, whichever winding first goes sufficiently negative to charge capacitor 37 to the breakdown voltage of the voltage breakdown device 42 establishes the pulse through the gate to cathode circuit. The control rectifier 20 fires and discharges the main capacitor 13 through the pulse transformer 14.

Applicant has found that this system provides a highly reliable means for triggering of an alternator driven capacitor discharge ignition system and in particular results in a highly favorable timing characteristic. A typical illustration of the characteristic is shown in FIG. 3 wherein the speed is plotted on the X axis and the angle of retard is plotted on the Y axis. Generally, the timing curve includes a first dip 45 and generally corresponding to the characteristic of the second winding 27 interconnected to a second substantially shallower dip 46 generally corresponding to a characteristic of first winding 26. The operating range of the engine 1, the limits of which are generally shown by the dashed vertical lines 47 and 48, extends between the rising portion of the first dip 45 and the rising portion of the second dip 46. Over the operating range, the angle of retard increases during a relatively short period at the low speed end of the operating range and thereafter decreases for a period with the final operating speed including a slightly increasing angle of retard. However, the total retard is not excessively great at any point in the overall operating cycle and advance can readily be obtained by proper turning of the alternator. Further, the timing characteristics having the increased angle of retard immediately adjacent the low speed operating range is highly desirable. When the engine is cut or throttled back to low speed and the engine shifted into neutral, the tendency of the engine to increase in speed as a result of the unloading is opposed by the increasing retard angle of firing.

In summary, the output of the alternator 6 is connected to provide charging of the capacitor 13 during the positive portion of the cycle and to provide a trigger pulse to the trigger capacitor 37 during each negative portion of the cycle. Although both continuously provide a charging source for charging of the main capacitor and firing of the rectifier, the peak output of the windings occurs at different speeds. The characteristic of winding 27 is such that maximum output is established at a relative low engine speed and that of the winding 26 such that maximum output is established at a relative high speed. For example, for an outboard motor, the winding 27 may provide a peak output at about 700 RPM and the winding 26 may provide a peak output at about 3,600 RPM. Both windings continuously provide output power but in differing degrees. At any time during the operating range which particular winding or windings provide the desired triggering is determined by which first goes sufficiently negative.

The action would appear to result from the following interaction of the windings 26 and 27 and the charging circuit for the capacitor 37. The alternator which inherently introduces inductance into the circuit and the capacitor creates a circuit having both capacitance and inductance and thus the phase of the voltage varies with speed. Under open circuit conditions, the output of both windings 26 and 27 connected to charge the capacitor 37, the firing angle is responsive not only to the amplitude of the voltage but also to the phase shift. During the initial or low end of the speed range, the firing angle increases slightly with speed because of the increasing voltage amplitude of winding 27 with speed until a phase shift effect causes a retard of the firing angle. As the speed increases further, the amplitude of the voltage produced by first winding 26 increases and since its phase shift is then negligible it becomes increasingly more effective and results in a reversal of the rate of change of the firing angle to a slight lead. As the speed increases further, phase shift in winding 26 with respect to the alternator shaft results in a further retarding of the firing angle, as shown in FIG. 3.

In the illustrated embodiment of the invention, the windings are connected in series to charge the capacitors. If desired the windings may also be connected in parallel with the appropriate diodes or other blocking means inserted in series with each. For example, windings 26 and 27 of FIG. 2 may be connected in parallel circuit with the only change required being the lower end connection of the winding 27 to winding 26 being transferred to the opposite end of winding 26.

The terminology "phase" as employed herein represents the relationship of the electrical values to the position of the alternator rotor and stator. It is realized these electrical quantities are not purely sinusoidal and that the electrical values referred to may be either instanteous voltage or the volt time integral of a portion of a cycle thereof or a combination thereof.

The present invention essentially eliminates the eratic result when the triggered switch device is fired from a single winding of a multiple winding alternator.

Various modes of carrying out the invention are contemplated as being within the scope of the following claims particularly pointing out and distinctly claiming the subject matter which is regarded as the invention.

I claim:

1. An alternator driven capacitor discharge system having an alternator including at least a pair of winding means having overlapping alternating current output voltages connected to charge an energy storage means during a given portion of each cycle of the output of each of the winding means, said storage means being connected in an output circuit with a switch means having a control input means, the improvement comprising firing means connected to said control input means and to both of said winding means and responsive to the relative amplitude and phase of the voltages produced by each cycle of the output of both of said winding means to actuate said switch means during each cycle and discharge the energy in said storage means in timed relation to the rotation of said alternator with the same winding means that charges said energy storage means operative to actuate said switch means, said winding means having differently varying outputs with speed, and means correspondingly connecting said winding means to said firing means such that one winding essentially controls the firing in one speed range and the other winding essentially controls the firing in a different speed range, and wherein said alternator charges the energy storage means during one polarity of a full cycle and actuate the firing means during the alternate opposite polarity of the cycle and said pair of winding means having a first winding providing a peak output at a first selected speed and a second winding providing a peak output at a second selected speed and establishing substantially in phase outputs under open circuit conditions and a trigger capacitor means connected to both said windings and selectively charged by the output of said windings in accordance with the speed of the engine to a selected level and then discharged into said switch means to fire said switch means.

2. An alternator driven capacitor discharge system having an alternator including at least a pair of winding means having overlapping alternating current output voltages connected to charge an energy storage means during a given portion of each cycle of the output of each of the winding means, said storage means being connected in an output circuit with a switch means having a control input means, the improvement comprising firing means connected to said control input means and to both of said winding means and responsive to the relative amplitude and phase of the voltages produced by each cycle of the output of both of said winding means to actuate said switch means during each cycle and discharge the energy in said storage means in timed relation to the rotation of said alternator with the same winding means that charges said energy storage means operative to actuate said switch means, said winding means having differently varying outputs with speed, and means correspondingly connecting said winding means to said firing means such that one winding essentially controls the firing in one speed range and the other winding essentially controls the firing in different speed range, and wherein said alternator charges the energy storage means during one polarity of a full cycle and actuates the firing means during the alternate opposite polarity of the cycle and said pair of winding means having a first winding (adapted to provide) providing a peak output at a selected speed and a second winding (adapted to provide) providing a peak output at a second selected speed and establishing substantially in phase outputs under open circuit conditions and a trigger capacitor means connected to both said windings and charged by one of said windings and then discharged into said switch means to fire said switch means over a first speed range and charged by the other of said windings and then discharged into said switch means to fire said switch means over a second speed range.

3. An alternator driven capacitor discharge system having an alternator including at least a pair of winding means having overlapping alternating current output voltages connected to charge an energy storage meand during a given portion of each cycle of the output of each of the winding means, said storage means being connected in an output circuit with a switch means having a control input means, the improvement comprising firing means connected to said control input means and to both of said winding means and responsive to the relative amplitude and phase of the voltages produced by each cycle of the output of both of said winding means to actuate said switch means during each cycle and discharge the energy in said storage means in timed relation to the rotation of said alternator with the same winding means that charges said energy storage means operative to actuate said switch means, said winding means having differently varying outputs with speed, and means correspondingly connecting said winding means to said firing means such that one winding essentially controls the firing in one speed range and the other winding essentially controls the firing in a different speed range, and wherein said alternator charges the energy storage means during one polarity of a full cycle and actuates the firing means during the alternate opposite polarity of the cycle and having a first winding to provide a peak output at a selected speed and a second winding to provide a peak output at a second selected speed and establishing substantially in phase outputs at low speeds, a trigger capacitor means connected to both said windings and including diode means to pass a selected polarity of the cycle to selectively charge said capacitor only during the corresponding polarity portion of the cycle of the output of said windings, and a voltage sensitive device connected across said capacitor in series with an input of said switch means whereby said capacitor is charged to a selected level and then discharged into said switch means to fire said switch means.

4. An alternator driven capacitor discharge system having an alternator including at least a pair of winding means having overlapping alternating current output voltages connected to charge an energy storage means during a given portion of each cycle of the output of each of the winding means, said storage means being connected in an output circuit with a switch means having a control input means, the improvement comprising firing means connected to said control input means and to both of said winding means and responsive to the relative amplitude and phase of the voltages produced by each cycle of the output of both of said winding means to actuate said switch means during each cycle and discharge the energy in said storage means in timed relation to the rotation of said alternator with the same winding means that charges said energy storage means operative to actuate said switch means, said winding means having differently varying outputs with speed, and means correspondingly connecting said winding means to said firing means such that one winding essentially controls the firing in one speed range and the other winding essentially controls the firing in a different speed range, and wherein said alternator charges the energy storage means during one polarity of a full cycle and actuates the firing means during the alternate opposite polarity of the cycle and wherein said energy storage means is a main capacitor, said winding means includes a first winding having a peak output at a selected engine speed and connected in series with a first diode across the main capacitor and a second winding having a peak output at a selected higher engine speed, a second diode connected in series with the second winding across the first diode, said switch means having a pair of input elements, said firing means includes a trigger capacitor having one end connected to one of said input elements, and the opposite end connected to like polarity ends of said windings, a resistor connected between the high speed winding and the trigger capacitor, a resistor in series with a diode connected between the low speed winding and the trigger capacitor, a voltage sensitive switch means connected across the trigger capacitor and the switch means, and a diode connected in parallel with said voltage sensitive switch means.

5. An alternator driven capacitor discharge system having an alternator including at least a pair of winding means having overlapping alternating current output voltages connected to charge an energy storage means during a given portion of each cycle of the output of each of the winding means, said storage means being connected in an output circuit with a switch means having a control input means, the improvement comprising firing means connected to said control input means and to both of said winding means and responsive to the relative amplitude and phase of the voltages produced by each cycle of the output of both of said winding means to actuate said switch means during each cycle and discharge the energy in said storage means in timed relation to the rotation of said alternator with the same winding means that charges said energy storage means operative to actuate said switch means, said winding means having differently varying outputs with speed, and means correspondingly connecting said winding means to said firing means such that one winding essentially controls the firing in one speed range and the other winding essentially controls the firing in a different speed range, and wherein said alternator charges the energy storage means during one polarity of a full cycle and actuates the firing means during the alternate opposite polarity of the cycle and wherein said energy storage means is a main capacitor, said winding means includes a first winding having a peak output at a selected engine speed and connected in series with a first diode across the main capacitor and a second winding having a peak output at a selected higher engine speed, a second diode connected in series with the second winding across the first diode, said switch means having a pair of input elements, said firing means includes a trigger capacitor having one end connected to one of said input elements, and the opposite end connected to like polarity ends of said windings, an inpedance connected between the high speed winding and the trigger capacitor, an impedance in series with a diode connected between the low speed winding and the trigger capacitor, a voltage sensitive switch means connected across the trigger capacitor and the switch means, and a diode connected in parallel with said voltage sensitive switch means.

6. An alternator driven capacitor discharge system having an alternator including at least a pair of winding means having overlapping alternating current output voltages connected to charge an energy storage means during a given portion of each cycle of the output of each of the winding means, said storage means being connected in an output circuit with a switch means having a control input means, the improvement comprising firing means connected to said control input means and to both of said winding means and responsive to the relative amplitude and phase of the voltages produced by each cycle of the output of both of said winding means to actuate said switch means during each cycle and discharge the energy in said storage means in timed relation to the rotation of said alternator with the same winding means that charges said energy storage means operative to actuate said switch means, said winding means having differently varying outputs with speed, and means correspondingly connecting said winding means to said firing means such that one winding essentially controls the firing in one speed range and the other winding essentially controls the firing in a different speed range, and wherein said alternator charges the energy storage means during one polarity portion of each cycle and actuates the firing means furing the alternate opposite polarity portion of each cycle and wherein said winding means includes a first winding having a relatively greater number of turns than a second winding, and the means of triggering said triggered switch means includes a capacitor means connected to both said windings and charged by corresponding opposite polarity portions of said windings and charged by corresponding opposite polarity portions of said windings to a selected level, and (then) a voltage responsive means connecting the capacitor means to the switch means and (discharged) discharging said capacitor means into said triggered switch means to fire said triggered switch means during said corresponding opposite polarity portion.

7. In an outboard motor having an internal-combustion engine and a capacitor discharge ignition system for firing of the engine, said ignition system including an alternator driven by the engine and having a first winding and a second winding establishing substantially in phase outputs under open circuit conditions and having a triggered switch means controlling the output of the ignition system, the output of said first winding establishing a peak output at a selected speed and the output of the other of said windings establishing a peak output at a different selected speed, the improvement in the means of triggering said triggered switch means comprising means connected to both said windings and selectively actuated by the outputs of both said windings to fire said triggered switch means, and wherein said second winding includes a relatively great number of turns and said first winding a relatively small number of turns, and the means of triggering said triggered switch means includes a capacitor means connected to both said windings and selectively charged by the output of said winding in accordance with the speed of the engine to a selected level and (then discharged) voltage responsive means connected between the capacitor mean and triggered switch means discharging the capacitor means into said triggered switch means to fire said triggered switch means.

8. In an alternator driven capacitor discharge system having an alternator including at least a pair of windings connected to charge an energy storage capacitor means and to actuate a switch means connected with energy storage means to selectively discharge the stored energy, the improvement in the means to actuate said switch means comprising means connected to both of said windings to combine the outputs and establishing a firing signal impressed upon said switch means to operate the switch means, said windings wound to establish essentially in-phase voltages at low speed and having different impedances and said combined outputs establishing an angle of retard varying with the speed of the engine, said angle of retard increasing over a selected low speed range of engine speed.

9. The alternator driven capacitor discharge ignition system of claim 7 wherein the impedances of said pair of windings differ and establishes a selected varying of the angle of retard with said angle of retard initially decreasing with speed from zero to a certain speed, increasing with speed to a second speed, decreasing with speed to a third speed and thereafter increasing with speed.

10. The alternator driven capacitor discharge ignition system of claim 9 wherein the rate of increase with speed is the lowest after said third speed and having means to drive said alternator with an operating speed range generally covering a lowest speed which is centrally of the first and second speed and a highest speed which is substantially above said third speed.

11. In an outboard motor having an internal combustion engine and having a shift means with a neutral position and an alternator driven capacitor discharge ignition system, said alternator including at least a pair of windings connected to charge an energy storage means and to actuate a switch means connected with energy storage means to selectively discharge the stored energy, the improvement in the means to actuate said switch means comprising means connected to both of said windings to combine the outputs of said windings and establishing a firing signal to said switch means, the impedances of said windings being selected to vary the outputs of the windings with speed to vary the firing signal and establishing an angle of retard varying with the speed of the engine, said angle of retard increasing over a selected low speed range of engine speed to permit shifting of the engine to neutral without the engine speed appreciably increasing.

12. An alternator driven capacitor discharge system having an alternator including winding means connected to charge an energy storage means during a given portion of each cycle of the output, said storage means being connected in an output circuit with a switch means having a control input means connected to a firing means, the improvement in said firing means comprising a trigger capacitor, an impedance means connected in series with the trigger capacitor between the input means and the winding, and a voltage sensitive device connected across the trigger capacitor and the input means.

13. The alternator driven capacitor discharge system of claim 12 wherein said impedance means includes a resistance in series with a diode means.

* * * * *